(12) United States Patent
Yao et al.

(10) Patent No.: US 11,791,460 B2
(45) Date of Patent: Oct. 17, 2023

(54) ELECTRODE ASSEMBLY, SECONDARY BATTERY, BATTERY MODULE, BATTERY PACK AND POWER CONSUMING DEVICE

(71) Applicant: CONTEMPORARY AMPEREX TECHNOLOGY CO., LIMITED, Fujian (CN)

(72) Inventors: Bin Yao, Fujian (CN); Ying Huang, Fujian (CN); Ruiying Shi, Fujian (CN); Jiang Liu, Fujian (CN); Xuefang Chen, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/197,108

(22) Filed: May 15, 2023

(65) Prior Publication Data

US 2023/0282813 A1 Sep. 7, 2023

Related U.S. Application Data

(63) Continuation of application No. PCT/CN2021/132493, filed on Nov. 23, 2021.

(51) Int. Cl.
*H01M 4/36* (2006.01)
*H01M 10/0525* (2010.01)
(Continued)

(52) U.S. Cl.
CPC .......... *H01M 4/366* (2013.01); *H01M 4/583* (2013.01); *H01M 4/5825* (2013.01);
(Continued)

(58) Field of Classification Search
None
See application file for complete search history.

(56) References Cited

U.S. PATENT DOCUMENTS

| 2011/0143197 | A1* | 6/2011 | Ohtsuka | ............ H01M 10/0567 |
| | | | | 429/207 |
| 2015/0146341 | A1  | 5/2015 | Fuchigami et al. | |
| 2017/0077517 | A1* | 3/2017 | Nishide | ................ H01M 4/606 |

FOREIGN PATENT DOCUMENTS

| CN | 103022496 A | 4/2013 |
| CN | 103137946 A | 6/2013 |
(Continued)

OTHER PUBLICATIONS

International Search Report and Written Opinion dated Aug. 29, 2022, received for PCT Application PCT/CN2021/132493, filed on Nov. 23, 2021, 16 pages including English Translation.

*Primary Examiner* — Wyatt P McConnell
(74) *Attorney, Agent, or Firm* — XSENSUS LLP

(57) ABSTRACT

An electrode assembly may comprise a positive electrode plate and a negative electrode plate, wherein a positive electrode active material layer of the positive electrode plate may comprise a positive electrode active material and a quinone compound; and a negative electrode active material layer of the negative electrode plate may comprise a negative electrode active material and a conductive polymer material, wherein based on the mass of the positive electrode active material layer, the mass content of the quinone compound mc % may be 0.5% to 3%; the capacity per gram of the quinone compound may be $Cap_c$; the capacity per gram of the positive electrode active material may be Cap; and based on the mass of the negative electrode active material layer, the mass content of the conductive polymer material may be $m_A$ %, satisfying the relationship of:

$$0.2 \leq \frac{Cap_C - Cap}{Cap} \times m_C / m_A \leq 5.$$

15 Claims, 2 Drawing Sheets

(51) Int. Cl.
  *H01M 4/62*     (2006.01)
  *H01M 4/66*     (2006.01)
  *H01M 4/583*    (2010.01)
  *H01M 4/58*     (2010.01)
  *H01M 4/02*     (2006.01)

(52) U.S. Cl.
  CPC ........... *H01M 4/624* (2013.01); *H01M 4/663* (2013.01); *H01M 10/0525* (2013.01); *H01M 2004/021* (2013.01); *H01M 2004/027* (2013.01); *H01M 2004/028* (2013.01); *H01M 2220/20* (2013.01)

(56) References Cited

FOREIGN PATENT DOCUMENTS

| | | |
|---|---|---|
| CN | 110061188 A | 7/2019 |
| CN | 111725575 A | 9/2020 |
| CN | 113363484 A | 9/2021 |
| CN | 113501792 A | 10/2021 |
| JP | 2012-113841 A | 6/2012 |

* cited by examiner

# ELECTRODE ASSEMBLY, SECONDARY BATTERY, BATTERY MODULE, BATTERY PACK AND POWER CONSUMING DEVICE

CROSS-REFERENCE TO RELATED APPLICATION

The present application is a continuation of International Application No. PCT/CN2021/132493, filed Nov. 23, 2021, which is incorporated herein by reference in its entirety.

TECHNICAL FIELD

The present application relates to the field of lithium batteries, and in particular to an electrode assembly, a secondary battery, a battery module, a battery pack and a power consuming device.

BACKGROUND ART

Lithium ion batteries have the advantages such as a long cycle life, a small volume, a light weight and good safety, and are widely used in various fields such as portable electronic devices, electric energy storages and electric vehicles.

With the rapid development of portable electronic devices, electric energy storages and electric vehicles, there is an increasing requirement for the energy density of lithium ion batteries. Therefore, there is an urgent need to further improve the energy density of lithium ion batteries.

SUMMARY OF THE DISCLOSURE

In view of the above problems, the present application has been made with an objective to improve the energy density of a lithium ion battery.

In order to achieve the above objective, the present application provides an electrode assembly, a secondary battery, a battery module, a battery pack and a power consuming device.

A first aspect of the present application provides an electrode assembly, comprising a positive electrode plate and a negative electrode plate, wherein the positive electrode plate comprises a positive electrode current collector and a positive electrode active material layer provided on at least one surface of the positive electrode current collector, the positive electrode active material layer comprising a positive electrode active material and a quinone compound; the negative electrode plate comprises a negative electrode current collector and a negative electrode active material layer provided on at least one surface of the negative electrode current collector, the negative electrode active material layer comprising a negative electrode active material and a conductive polymer material; wherein based on the mass of the positive electrode active material layer, the mass content of the quinone compound $m_c$ % is 0.5% to 3%; the capacity per gram of the quinone compound is $Cap_c$; the capacity per gram of the positive electrode active material is Cap; and based on the mass of the negative electrode active material layer, the mass content of the conductive polymer material is $m_A$ %, satisfying the relationship of:

$$0.2 \leq \frac{Cap_C - Cap}{Cap} \times m_C / m_A \leq 5.$$

The quinone compound comprised in the positive electrode active material layer of the positive electrode plate of the present application provides additional lithium intercalation vacancies to increase the lithium storage capacity of the positive electrode plate; and the conductive polymer material comprised in the negative electrode active material layer is used to improve the kinetic performance of the negative electrode plate and increase the content of lithium de-intercalated from the lithium ion battery during discharging. By the cooperative control of the addition proportions of the quinone compound and the conductive polymer, the energy density of lithium ion batteries is improved.

In any embodiment, the quinone compound includes at least one of benzoquinone and derivatives thereof, naphthoquinone and derivatives thereof, and anthraquinone and derivatives thereof.

In any embodiment, the conductive polymer material includes at least one of polyaniline, polypyrrole, polythiophene, polyoxyethylene, polyacrylonitrile, polyphenylene and polyacetylene.

In any embodiment, the positive electrode active material layer has an areal density of 16.2 mg/cm$^2$ to 40.0 mg/cm$^2$ and the negative electrode active material layer has an areal density of 5.8 mg/cm$^2$ to 18.0 mg/cm$^2$.

In any embodiment, the positive electrode active material layer comprises multiple positive electrode active material sublayers successively stacked along the direction away from the positive electrode current collector, wherein at least one of the multiple positive electrode active material sublayers includes the quinone compound.

In any embodiment, the outermost positive electrode active material sublayer of the multiple positive electrode active material sublayers away from the positive electrode current collector includes the quinone compound, and the remaining positive electrode active material sublayers may or may not include the quinone compound. Optionally, the remaining positive electrode active material sublayers do not include the quinone compound.

In any embodiment, the negative electrode active material layer comprises m negative electrode active material sublayers successively stacked along the direction away from the negative electrode current collector, wherein n negative electrode active material sublayers close to the negative electrode current collector include the conductive polymer material, wherein m/3<n<m, the m is a positive integer greater than or equal to 2, and n is a positive integer greater than or equal to 1.

In any embodiment, the negative electrode active material layer comprises two negative electrode active material sublayers, wherein a first negative electrode active material sublayer close to the negative electrode current collector includes first graphite, a second negative electrode active material sublayer away from the negative electrode current collector includes second graphite, the difference between the capacity per gram of the second graphite and the capacity per gram of the first graphite is greater than or equal to 8 mAh/g.

In any embodiment, the negative electrode active material layer comprises two negative electrode active material sublayers, wherein a first negative electrode active material sublayer close to the negative electrode current collector includes first graphite, a second negative electrode active material sublayer away from the negative electrode current collector includes second graphite, the difference between the capacity per gram of the second graphite and the capacity per gram of the first graphite is less than 8 mAh/g, the specific surface area of the second graphite BET2 is greater than the specific surface area of the first graphite BET1, preferably, BET1 is 0.2 m$^2$/g to 0.8 m$^2$/g, and BET2 is 1 m$^2$/g to 2 m$^2$/g.

In any embodiment, the negative electrode active material layer comprises two negative electrode active material sublayers, wherein a first negative electrode active material sublayer close to the negative electrode current collector includes graphite, and a second negative electrode active material sublayer away from the negative electrode current collector includes SiO.

In any embodiment, the positive electrode active material comprises at least one of lithium iron phosphate, lithium manganate, lithium nickel cobalt manganese oxide, lithium cobaltate and nickel-manganese spinel; and the negative electrode active material includes at least one of graphite, hard carbon, molybdenum disulfide, silicon, silicon monoxide, ferroferric oxide, tin oxide and titanium dioxide.

A second aspect of the present application provides a secondary battery, comprising the electrode assembly of the first aspect of the present application.

A third aspect of the present application provides a battery module, comprising a secondary battery of the second aspect of the present application.

A fourth aspect of the present application provides a battery pack, comprising a battery module of the third aspect of the present application.

A fifth aspect of the present application provides a power consuming device, comprising at least one selected from a secondary battery of the second aspect of the present application, a battery module of the third aspect of the present application or a battery pack of the fourth aspect of the present application.

Beneficial effects of the present application: The present application provides an electrode assembly, a secondary battery, a battery module, a battery pack and a power consuming device, wherein the quinone compound comprised in the positive electrode active material layer of the positive electrode plate of the present application provides additional lithium intercalation vacancies to increase the lithium storage capacity of the positive electrode plate; and the conductive polymer material comprised in the negative electrode active material layer is used to improve the kinetic performance of the negative electrode plate and increase the content of lithium de-intercalated from the lithium ion battery during discharging. By the cooperative control of the addition proportions of the quinone compound and the conductive polymer, the energy density of lithium ion batteries is improved. Certainly, any product or method for implementing the present application are not necessarily required to achieve all of the above advantages simultaneously.

Figure 1:
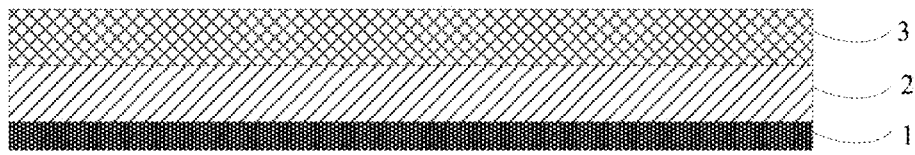
FIG. 1 is a schematic diagram of a positive electrode plate according to one embodiment of the present application.

List of Reference Numerals:
1—negative electrode current collector;
2—first negative electrode active material sublayer;
3—second negative electrode active material sublayer;
4—battery module;
5—secondary battery;
51—housing;
52—electrode assembly;
53—top cover assembly;
10—battery pack;
11—upper case body;
12—lower case body.

DETAILED DESCRIPTION OF EMBODIMENTS

Hereinafter, the embodiments of the electrode assembly, secondary battery, battery module, battery pack and power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the implementations and optional implementations of the present application can be combined with one another to form new technical solutions, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

In the research process of lithium ion batteries, the applicant has found that the lithium ion battery has the problem of a lower energy density, which makes it difficult for the lithium ion battery to meet the application requirements. In order to improve the energy density of the lithium ion battery such that the lithium ion battery has better performance such as a longer endurance mileage when used in a power consuming device, and in view of this, the present application provides an electrode assembly, a secondary battery, a battery module, a battery pack and a power consuming device.

In one embodiment of the present application, the present application proposes an electrode assembly comprising a positive electrode plate and a negative electrode plate, wherein the positive electrode plate comprises a positive electrode current collector and a positive electrode active material layer provided on at least one surface of the positive electrode current collector, the positive electrode active material layer comprising a positive electrode active material and a quinone compound. The negative electrode plate comprises a negative electrode current collector and a negative electrode active material layer provided on at least one surface of the negative electrode current collector, the negative electrode active material layer comprising a negative electrode active material and a conductive polymer material; wherein based on the mass of the positive electrode active material layer, the mass content of the quinone compound $m_C$ % is 0.5% to 3%; the capacity per gram of the quinone compound is $Cap_C$; the capacity per gram of the positive electrode active material is $Cap$; and based on the mass of the negative electrode active material layer, the mass content of the conductive polymer material is $m_A$ %, satisfying the relationship of:

$$0.2 \leq \frac{Cap_C - Cap}{Cap} \times m_C / m_A \leq 5.$$

Without being limited to any theory, by research, the applicant has found that the quinone compound comprised in the positive electrode active material layer can provide additional lithium intercalation vacancies to increase the lithium storage capacity of the positive electrode plate; and the conductive polymer material comprised in the negative electrode active material layer is used to improve the kinetic performance of the negative electrode plate and increase the content of lithium de-intercalated from the lithium ion battery during discharging. By synergistically controlling the addition proportions of the quinone compound and the conductive polymer, the energy density of lithium ion batteries is improved.

In some embodiments, the quinone compound includes at least one of benzoquinone and derivatives thereof, naphthoquinone and derivatives thereof, and anthraquinone and derivatives thereof.

In some embodiments, the conductive polymer material includes at least one of polyaniline, polypyrrole, polythiophene, polyoxyethylene, polyacrylonitrile, polyphenylene and polyacetylene.

In some embodiments, the positive electrode active material layer has an areal density of 16.2 mg/cm² to 40.0 mg/cm², e.g. the positive electrode active material layer can have an areal density of 20.0 mg/cm², 24.0 mg/cm², 28.0 mg/cm², 32.0 mg/cm², 36.0 mg/cm² or any range therebetween. Without being limited to any theory, the applicant has found that when the areal density of the positive electrode active material layer is too low, for example, lower than 16.2 mg/cm², the electrode plate becomes longer at the same capacity, and the amount of the substrate increases, which is not conducive to the improvement of energy density; and when the areal density of the positive electrode active material layer is too high, for example, higher than 40.0 mg/cm², due to the increased time and force required for thickness compression during the processing of the electrode plate, it is not easy to press the electrode plate to a higher density, which reduces the compaction density, and is not conducive to the improvement of energy density. By adjusting and controlling the areal density of the positive electrode active material layer within the above range, the energy density of the lithium ion battery can be improved.

In some embodiments, the negative electrode active material layer has an areal density of 5.8 mg/cm² to 18.0 mg/cm², e.g. the negative electrode active material layer can have an areal density of 6.0 mg/cm², 8.0 mg/cm², 10.0 mg/cm², 12.0 mg/cm², 14.0 mg/cm², 16.0 mg/cm² or any range therebetween. Without being limited to any theory, the applicant has found that when the areal density of the negative electrode active material layer is too low, for example, lower than 5.8 mg/cm², the electrode plate becomes longer at the same capacity, and the amount of the substrate increases, which is not conducive to the improvement of energy density; and when the areal density of the negative electrode active material layer is too high, for example, higher than 18.0 mg/cm², due to the increased time and force required for thickness compression during the processing of the electrode plate, it is not easy to press the electrode plate to a higher density, which reduces the compaction density, and is not conducive to the improvement of energy density. By adjusting and controlling the areal density of the negative electrode active material layer within the above range, the energy density of the lithium ion battery can be improved.

In some embodiments, the positive electrode active material layer comprises multiple positive electrode active material sublayers successively stacked, wherein at least one of the multiple positive electrode active material sublayers includes the quinone compound.

In some embodiments, the outermost positive electrode active material sublayer of the multiple positive electrode active material sublayers away from the positive electrode current collector includes the quinone compound, and the remaining positive electrode active material sublayers may or may not include the quinone compound. Optionally, the remaining positive electrode active material sublayers do not include the quinone compound.

The applicant has found that, without being limited to any theory, by allowing the outermost positive electrode active material sublayer of the multiple positive electrode active material sublayers away from the positive electrode current collector to contain a quinone compound, that is, the quinone compound is provided away from the positive electrode current collector, the migration path of lithium ions during the discharge of lithium ion batteries can be shortened, the polarization can be reduced, the lithium intercalation ability of the quinone compound during the discharge of lithium ion batteries can be enhanced, and the energy density of lithium ion batteries can be improved.

In some embodiments, the negative electrode active material layer comprises m negative electrode active material sublayers successively stacked along the direction away from the negative electrode current collector, wherein n negative electrode active material sublayers close to the negative electrode current collector include the conductive polymer material, wherein m/3<n<m, the m is a positive integer greater than or equal to 2, and n is a positive integer greater than or equal to 1.

The applicant has found that, without being limited to any theory, compared with the negative electrode active material sublayer in the negative electrode active material layer that is away from the negative electrode current collector, the lithium deintercalation is more difficult in the negative electrode active material sublayer in the negative electrode active material layer that is close to the negative electrode current collector. The n negative electrode active material sublayers provided close to the negative electrode current collector comprise a conductive polymer material, that is, the conductive polymer material is provided close to the negative electrode current collector, the dynamic performance of the negative electrode active material sublayer in the negative electrode active material layer which is close to the negative electrode current collector can be improved, the content of lithium de-intercalated from the negative electrode plate during the discharge can be increased, and the energy density of the lithium ion battery can be improved.

Preferably, the m negative electrode active material sublayers can all comprise a conductive polymer material. The applicant has found that, without being limited to any theory, by allowing all the negative electrode active material sublayers to include a conductive polymer material, ion paths can be formed throughout the entire negative electrode active material layer, fully improving the kinetic performance of the entire negative electrode plate, and increasing the content of lithium de-intercalated from the negative electrode plate during the discharge, thereby obtaining a lithium ion battery with good energy density.

In some embodiments, as shown in FIG. 1, the negative electrode active material layer comprises two negative electrode active material sublayers, including a first negative electrode active material sublayer 2 close to the negative electrode current collector 1 and a second negative electrode active material sublayer 3 away from the negative electrode current collector 1, wherein the first negative electrode active material sublayer 2 close to the negative electrode current collector 1 includes first graphite, the second negative electrode active material sublayer 3 away from the negative electrode current collector 1 includes second graphite, the difference between the capacity per gram of the second graphite and the capacity per gram of the first graphite is greater than or equal to 8 mAh/g.

The applicant has found that, without being limited to any theory, by allowing the difference between the capacity per gram of the second graphite Cap2 and the capacity per gram of the first graphite Cap1 to be greater than or equal to 8 mAh/g, that is, Cap2−Cap1 ≥8 mAh/g, the second graphite on the surface of the negative electrode current collector can provide more lithium intercalation vacancies to avoid lithium precipitation due to insufficient vacancies, so as to obtain lithium ion batteries with a high energy density.

In some embodiments, the negative electrode active material layer comprises two negative electrode active material sublayers, wherein the first negative electrode active material sublayer close to the negative electrode current collector includes first graphite, the second negative electrode active material sublayer away from the negative electrode current collector includes second graphite, the difference between the capacity per gram of the second graphite Cap2 and the capacity per gram of the first graphite Cap1 is less than 8 mAh/g, that is Cap2−Cap1<8 mAh/g, the specific surface area of the second graphite BET2 is greater than the specific surface area of the first graphite BET1, preferably, BET1 is 0.2 $m^2/g$ to 0.8 $m^2/g$, and BET2 is 1 $m^2/g$ to 2 $m^2/g$.

The applicant has found that, without being limited to any theory, when the difference between the capacity per gram of the second graphite and the capacity per gram of the first graphite is less than 8 mAh/g, by allowing the specific surface area of the second graphite BET2 to be greater than or equal to the specific surface area of the first graphite BET1, the second graphite on the surface of the negative electrode current collector has better kinetic performance, avoiding the lithium precipitation on the anode surface due to insufficient kinetics, and improving the energy density of lithium ion batteries.

The applicant has found that, without being limited to any theory, the negative electrode active material layer comprises two negative electrode active material sublayers, wherein the first negative electrode active material sublayer close to the negative electrode current collector includes graphite, and the second negative electrode active material sublayer away from the negative electrode current collector includes SiO, wherein the specific surface area of graphite is 0.2 $m^2/g$ to 2 $m^2/g$, and the specific surface area of SiO is 0.5 $m^2/g$ to 3 $m^2/g$.

In some embodiments, the positive electrode active material comprises at least one of lithium iron phosphate, lithium manganate, lithium nickel cobalt manganese oxide, lithium cobaltate and nickel-manganese spinel. The negative electrode active material includes at least one of graphite, hard carbon, molybdenum disulfide, silicon, silicon monoxide, ferroferric oxide, tin oxide and titanium dioxide.

In addition, the secondary battery, battery module, battery pack and power consuming device of the present application are described below with reference to the accompanying drawings as appropriate.

In an embodiment of the present application, provided is a secondary battery, comprising the electrode assembly according to any one of the above embodiments. The secondary battery of the present application may refer to the lithium ion battery according to any one of the above embodiments.

Typically, a secondary battery comprises a positive electrode plate, a negative electrode plate, an electrolyte and a separator. During the charge/discharge process of the battery, the active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and enables ions to pass through.

[Positive Electrode Plate]

The positive electrode plate comprises a positive electrode current collector and a positive electrode active material layer provided on at least one surface of the positive electrode current collector.

As an example, the positive electrode current collector has two surfaces opposite in its own thickness direction, and the positive electrode active material layer is provided on either or both of the two opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the positive electrode active material layer optionally comprises a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode active material layer may also optionally comprise a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: the above-mentioned components for preparing the positive electrode plate, such as positive electrode active material, conductive agent, binder and any other components, are dispersed in a solvent (e.g. N-methylpyrrolidone) to form a positive electrode slurry; and coating a positive electrode current collector with the positive electrode slurry, followed by the procedures such as drying and cold pressing, so as to obtain the positive electrode plate.

[Negative Electrode Plate]

The negative electrode plate comprises a negative electrode current collector and a negative electrode active material layer provided on at least one surface of the negative electrode current collector, the negative electrode active material layer comprising a negative electrode active material.

As an example, the negative electrode current collector has two opposite surfaces in its own thickness direction, and the negative electrode active material layer is provided on either or both of the two opposite surfaces of the negative electrode current collector.

In some embodiments, the negative electrode current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material layer optionally comprises a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode active material layer may also optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode active material layer may also optionally comprises other auxiliary agents, for example thickener (e.g. sodium carboxymethyl cellulose (CMC-Na)) and the like.

In some embodiments, the negative electrode plate can be prepared as follows: the above-mentioned components for preparing the negative electrode plate, such as a negative electrode active material, a conductive agent, a binder and any other components, are dispersed in a solvent (e.g. deionized water) to form a negative electrode slurry; and the negative electrode slurry is coated onto a negative electrode current collector, and is then subjected to procedures such as drying and cold pressing, so as to obtain the negative electrode plate.

[Electrolyte]

The electrolyte is located between the positive electrode plate and the negative electrode plate and functions for ionic conduction. The type of the electrolyte is not specifically limited in the present application, and can be selected according to actual requirements. For example, the electrolyte may be liquid, gel or all solid.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may optionally comprise an additive. For example, the additive can include a negative electrode film-forming additive, a positive electrode film-forming additive, and also an additive that can improve certain performances of the battery, such as an additive that improve the overcharge performance of the battery, or an additive that improve the high temperature performance or low-temperature performance of the battery.

[Separator]

In some embodiments, the secondary battery further comprises a separator. The type of the separator is not particularly limited in the present application, and any well known porous-structure separator with good chemical stability and mechanical stability may be selected.

In some embodiments, the material of the separator can be selected from at least one of glass fibers, a non-woven, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

In some embodiments, an electrode assembly may be formed by a positive electrode plate, a negative electrode plate and a separator by a winding process or a laminating process.

In some embodiments, the secondary battery may comprise an outer package. The outer package can be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may include polypropylene, polybutylene terephthalate, and polybutylene succinate, etc.

Figure 2:
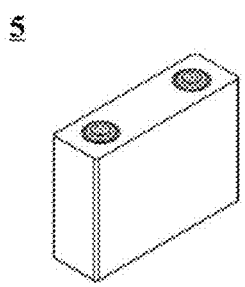
FIG. 2 is a schematic diagram of a secondary battery according to an embodiment of the present application.

The shape of the secondary battery is not particularly limited in the present application, and may be cylindrical, square or of any other shape. For example, FIG. 2 shows a secondary battery 5 with a square structure as an example.

Figure 3:
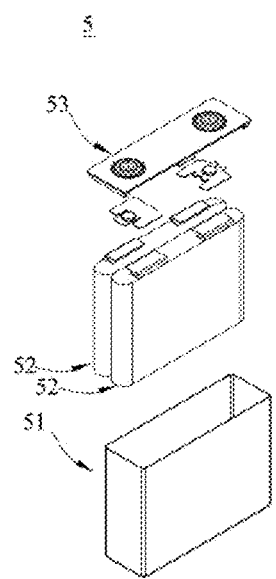
FIG. 3 is an exploded view of the secondary battery according to the embodiment of the present application as shown in FIG. 2.

In some embodiments, referring to FIG. 3, the outer package may include a housing 51 and a cover plate 53. Herein, the housing 51 may include a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can be subjected to a winding process or a lamination process to form an electrode assembly 52. The electrode assembly 52 is encapsulated in the accommodating cavity. The electrolyte infiltrates the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

Figure 4:
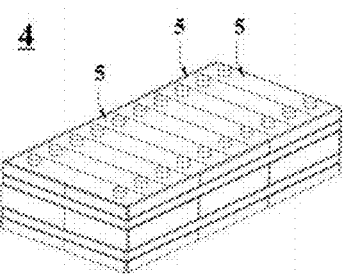
FIG. 4 is a schematic diagram of a battery module according to an embodiment of the present application.

FIG. 4 shows a battery module 4 as an example. Referring to FIG. 4, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above-mentioned battery module may also be assembled into a battery pack, the number of battery modules included in the battery pack may be one or more, and the specific number can be selected by those skilled in the art according to the application and capacity of the battery pack.

Figure 5:
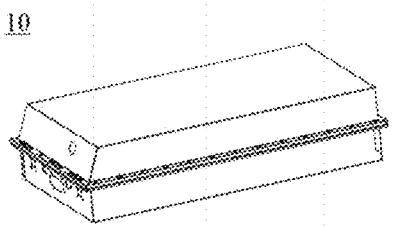
FIG. 5 is a schematic diagram of a battery pack according to an embodiment of the present application.
Figure 6:
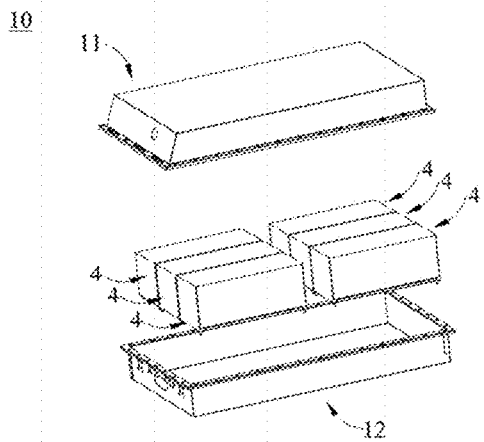
FIG. 6 is an exploded view of a battery pack according to an embodiment of the present application as shown in FIG. 5.

FIG. 5 and FIG. 6 show a battery pack 10 as an example. Referring to FIG. 5 and FIG. 6, the battery pack 10 may comprise a battery case and a plurality of battery modules 4 provided in the battery case. The battery case comprises an upper case body 11 and a lower case body 12, wherein the upper case body 11 can cover the lower case body 12 to form a closed space for accommodating the battery modules 4. A plurality of battery modules 4 may be arranged in the battery case in any manner.

In addition, the present application further provides a power consuming device. The power consuming device comprises at least one of the secondary battery, battery module, or battery pack provided by the present application. The secondary battery, battery module or battery pack may be used as a power source of the power consuming device or as an energy storage unit of the power consuming device. The power consuming device may include a mobile device (for example, a mobile phone or a laptop computer), an electric vehicle (for example, a battery electric vehicle, a hybrid electric vehicle, a plug-in hybrid electric vehicle, an electric bicycle, an electric scooter, an electric golf cart, or an electric truck), an electric train, ship, and satellite, and an energy storage system, but is not limited thereto.

As for the power consuming device, the secondary battery, battery module or battery pack can be selected according to the usage requirements thereof.

Figure 7:
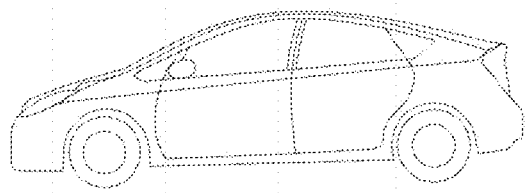
FIG. 7 is a schematic diagram of a power consuming device using a secondary battery according to an embodiment of the present application as a power source.

FIG. 7 shows a power consuming device as an example. The power consuming device may be a battery electric vehicle, a hybrid electric vehicle, a plug-in hybrid electric vehicle, or the like. In order to meet the requirements of the power consuming device for a high power and a high energy density of a secondary battery, a battery pack or a battery module may be used.

As another example, the device may be a mobile phone, a tablet, a laptop computer, etc. The device is generally required to be thin and light, and may use a secondary battery as a power source.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

Example 1

<Preparation of Positive Electrode Plate>

A positive electrode active material of lithium iron phosphate ($LiFePO_4$, LFP), a conductive agent conductive of carbon black, a binder of polyvinylidene fluoride (PVDF) and anthraquinone are mixed at a mass ratio of 96:1:2:1, then N-methylpyrrolidone (NMP) is added as a solvent, and the system is stirred under the action of a vacuum mixer until the system is homogeneous, to obtain a positive electrode slurry with a solid content of 65 wt %. The positive electrode slurry is uniformly coated onto one surface of an aluminum foil with a thickness of 13 μm, with the areal density of the positive electrode active material layer being 26.0 mg/cm$^2$, followed by drying at 120° C. and cold pressing, to obtain a positive electrode plate in which the compaction density of the positive electrode active material layer is 2.4 g/cm$^3$; and then the procedures such as tab forming and slitting are performed to obtain a positive electrode plate with a width of 180 mm.

<Preparation of Negative Electrode Plate>

A negative electrode active material of graphite, a conductive agent conductive of carbon black, a binder of sodium carboxymethylcellulose (CMC), a binder of a butadiene styrene rubber (SBR) and polyaniline are mixed at a mass ratio of 95:1:1:2:1, deionized water is added as a solvent, and the system is stirred under the action of a vacuum mixer until the system is homogeneous, to obtain a negative electrode slurry with a solid content of 54 wt %. The negative electrode slurry is uniformly coated onto one surface of a copper foil with a thickness of 8 μm, with the areal density of the negative electrode active material layer being 12.0 mg/cm$^2$, followed by drying at 110° C. and cold pressing, to obtain a negative electrode plate in which the compaction density of the negative electrode active material layer is 1.65 g/cm$^3$; and then the procedures such as tab forming and slitting are performed to obtain a negative electrode plate with a width of 183 mm.

<Preparation of Electrolyte Solution>

In an environment with a water content of less than 10 ppm, non-aqueous organic solvents of ethylene carbonate, dimethyl carbonate and methyl ethyl carbonate are mixed at a volume ratio of 1:1:1 to obtain an electrolyte solution solvent having a mass of 450 g, and then a lithium salt of LiPF$_6$ is dissolved in the mixed solvent, to make an electrolyte solution with a lithium salt concentration of 1 mol/L.

<Preparation of Separator>

Polyethylene with a thickness of 12 μm is selected as a separator, and slitted to obtain a separator with a width of 188 mm.

<Preparation of Lithium Ion Battery>

The above positive electrode plate, separator and negative electrode plate are stacked in sequence, such that the separator is located between the positive electrode plate and the negative electrode plate and functions for isolation, and then the stack is wound to obtain an electrode assembly; and the electrode assembly is placed in an outer package and dried, and then an electrolyte solution is injected, followed by the procedures such as vacuum encapsulation, leaving to stand, forming and shaping, to obtain a lithium ion battery.

Example 2

<Preparation of Positive Electrode Plate>

A positive electrode active material of LiNi$_{0.5}$Co$_{0.2}$Mn$_{0.3}$O$_2$ (NCM523), a conductive agent of conductive carbon black, a binder of polyvinylidene fluoride and anthraquinone are mixed at a mass ratio of 95:1:2:2, then N-methylpyrrolidone is added as a solvent, and the system is stirred under the action of a vacuum mixer until the system is homogeneous, to obtain a positive electrode slurry with a solid content of 75 wt %. The positive electrode slurry is uniformly coated onto one surface of an aluminum foil with a thickness of 13 μm, with the areal density of the positive electrode active material layer being 21.4 mg/cm$^2$, followed by drying at 120° C. and cold pressing, to obtain a positive electrode plate in which the compaction density of the positive electrode active material layer is 3.4 g/cm$^3$; and then the procedures such as tab forming and slitting are performed to obtain a positive electrode plate with a width of 180 mm.

<Preparation of Negative Electrode Plate>

A negative electrode active material of graphite, a conductive agent of conductive carbon black, a binder of sodium carboxymethylcellulose (CMC), a binder of a butadiene styrene rubber and polythiophen are mixed at a mass ratio of 94.5:1:1:2:1.5, deionized water is added as a solvent, and the system is stirred under the action of a vacuum mixer until the system is homogeneous, to obtain a negative electrode slurry with a solid content of 54 wt %. The negative electrode slurry is uniformly coated onto one surface of a copper foil with a thickness of 8 μm, with the areal density of the negative electrode active material layer being 12.0 mg/cm$^2$, followed by drying at 110° C. and cold pressing, to obtain a negative electrode plate in which the compaction density of the negative electrode active material layer is 1.65 g/cm$^3$; and then the procedures such as tab forming and slitting are performed to obtain a negative electrode plate with a width of 183 mm.

<Preparation of electrolyte solution>, <Preparation of Separator> and <Preparation of Lithium Ion Battery> are the same as those of example 1.

Example 3

<Preparation of Positive Electrode Plate>

<Preparation of First Positive Electrode Slurry>

A positive electrode active material of LiNi$_{0.5}$Co$_{0.2}$Mn$_{0.3}$O$_2$ (NCM523), a conductive agent conductive of carbon black, and a binder of polyvinylidene fluoride (PVDF) are mixed at a mass ratio of 97:1:2, then N-methylpyrrolidone (NMP) is added as a solvent, and the system is stirred under the action of a vacuum mixer until the system is homogeneous, to obtain a first positive electrode slurry with a solid content of 75 wt %.

<Preparation of Second Positive Electrode Slurry>

A positive electrode active material of lithium iron phosphate (LiFePO$_4$), a conductive agent of conductive carbon black, a binder of polyvinylidene fluoride (PVDF) and anthraquinone are mixed at a mass ratio of 95.5:1:2:1.5, then N-methylpyrrolidone (NMP) is added as a solvent, and the system is stirred under the action of a vacuum mixer until the system is homogeneous, to obtain a second positive electrode slurry with a solid content of 65 wt %.

<Preparation of Positive Electrode Plate Containing First Positive Electrode Active Material Sublayer and Second Positive Electrode Active Material Sublayer>

The prepared first positive electrode slurry and second positive electrode slurry are simultaneously coated, using a double layer coating process, onto one surface of an aluminum foil with a thickness of 13 μm, the first positive electrode active material sublayer and second positive electrode active material sublayer both having an areal density of 11.7 mg/cm$^2$, followed by drying at 120° C. and cold pressing, to obtain a positive electrode plate in which the compaction density of the positive electrode active material layer is 2.9 g/cm$^3$;

and then the procedures such as tab forming and slitting are performed to obtain a positive electrode plate with a width of 180 mm.

<Preparation of Negative Electrode Plate>

A negative electrode active material of graphite, a conductive agent conductive of carbon black, a binder sodium carboxymethylcellulose (CMC), a binder of butadiene styrene rubber (SBR) and polypyrrole are mixed at a mass ratio of 95:1:1:2:1, deionized water is added as a solvent, and the system is stirred under the action of a vacuum mixer until the system is homogeneous, to obtain a negative electrode slurry with a solid content of 54 wt %. The negative electrode slurry is uniformly coated onto one surface of a copper foil with a thickness of 8 μm, with the areal density of the negative electrode active material layer being 12.0 mg/cm$^2$, followed by drying at 110° C. and cold pressing, to obtain a negative electrode plate in which the compaction density of the negative electrode active material layer is 1.65 g/cm$^3$; and then the procedures such as tab forming and slitting are performed to obtain a negative electrode plate with a width of 183 mm.

<Preparation of Electrolyte Solution>, <Preparation of Separator> and <Preparation of Lithium Ion Battery> are the same as those of example 1.

Example 4

<Preparation of Positive Electrode Plate>

<Preparation of First Positive Electrode Slurry>

A positive electrode active material of lithium iron phosphate (LiFePO$_4$), a conductive agent conductive of carbon black, a binder of polyvinylidene fluoride (PVDF) and anthraquinone are mixed at a mass ratio of 95:1:2:2, then N-methylpyrrolidone (NMP) is added as a solvent, and the system is stirred under the action of a vacuum mixer until the system is homogeneous, to obtain a first positive electrode slurry with a solid content of 65 wt %.

<Preparation of Second Positive Electrode Slurry>

A positive electrode active material of lithium iron phosphate (LiFePO$_4$), a conductive agent conductive of carbon black, and a binder of polyvinylidene fluoride (PVDF) are mixed at a mass ratio of 97:1:2, then N-methylpyrrolidone (NMP) is added as a solvent, and the system is stirred under the action of a vacuum mixer until the system is homogeneous, to obtain a second positive electrode slurry with a solid content of 65 wt %.

<Preparation of Positive Electrode Plate Containing First Positive Electrode Active Material Sublayer and Second Positive Electrode Active Material Sublayer>

The prepared first positive electrode slurry and second positive electrode slurry are simultaneously coated, using a double layer coating process, onto one surface of an aluminum foil with a thickness of 13 μm, the first positive electrode active material sublayer and second positive electrode active material sublayer both having an areal density of 13.0 mg/cm$^2$, followed by drying at 120° C. and cold pressing, to obtain a positive electrode plate in which the compaction density of the positive electrode active material layer is 2.4 g/cm$^3$; and then the procedures such as tab forming and slitting are performed to obtain a positive electrode plate with a width of 180 mm.

<Preparation of Negative Electrode Plate>

A negative electrode active material of graphite, a conductive agent conductive of carbon black, a binder of sodium carboxymethylcellulose (CMC), a binder of a butadiene styrene rubber (SBR) and polyaniline are mixed at a mass ratio of 95:1:1:2:1, deionized water is added as a solvent, and the system is stirred under the action of a vacuum mixer until the system is homogeneous, to obtain a negative electrode slurry with a solid content of 54 wt %. The negative electrode slurry is uniformly coated onto one surface of a copper foil with a thickness of 8 μm, with the areal density of the negative electrode active material layer being 12.0 mg/cm$^2$, followed by drying at 110° C. and cold pressing, to obtain a negative electrode plate in which the compaction density of the negative electrode active material layer is 1.65 g/cm$^3$; and then the procedures such as tab forming and slitting are performed to obtain a negative electrode plate with a width of 183 mm.

<Preparation of lectrolyte solution>, <Preparation of Separator> and <Preparation of Lithium Ion Battery> are the same as those of example 1.

Example 5

<Preparation of Positive Electrode Plate>

A positive electrode active material of LiNi$_{0.5}$Co$_{0.2}$Mn$_{0.2}$O$_2$, a positive electrode active material of lithium iron phosphate (LiFePO$_4$), a conductive agent conductive of carbon black, a binder of polyvinylidene fluoride and naphthoquinone are mixed at a mass ratio of 48:48:1:2:1, then N-methylpyrrolidone (NMP) is added as a solvent, and the system is stirred under the action of a vacuum mixer until the system is homogeneous, to obtain a positive electrode slurry with a solid content of 68 wt %. The positive electrode slurry is uniformly coated onto one surface of an aluminum foil with a thickness of 13 μm, with the areal density of the positive electrode active material layer being 23.4 mg/cm$^2$, followed by drying at 120° C. and cold pressing, to obtain a positive electrode plate in which the compaction density of the positive electrode active material layer is 2.9 g/cm$^3$; and then the procedures such as tab forming and slitting are performed to obtain a positive electrode plate with a width of 180 mm.

<Preparation of negative electrode plate>, <Preparation of Electrolyte Solution>, <Preparation of Separator> and <Preparation of Lithium Ion Battery> are the same as those of example 3.

Example 6

<Preparation of Positive Electrode Plate>

<Preparation of First Positive Electrode Slurry>

A positive electrode active material of lithium iron phosphate (LiFePO$_4$), a conductive agent conductive of carbon black, and a binder of polyvinylidene fluoride are mixed at a mass ratio of 97:1:2, then N-methylpyrrolidone (NMP) is added as a solvent, and the system is stirred under the action of a vacuum mixer until the system is homogeneous, to obtain a first positive electrode slurry with a solid content of 65 wt %.

<Preparation of Second Positive Electrode Slurry>

Benzoquinone, a conductive agent of conductive carbon black, and a binder of polyvinylidene fluoride are mixed at a mass ratio of 7:1:2, then N-methylpyrrolidone (NMP) is added as a solvent, and the system is stirred under the action of a vacuum mixer until the system is homogeneous, to obtain a second positive electrode slurry with a solid content of 45 wt %.

<Preparation of Positive Electrode Plate Containing First Positive Electrode Active Material Sublayer and Second Positive Electrode Active Material Sublayer>

The prepared first positive electrode slurry and second positive electrode slurry are simultaneously coated, using a double layer coating process, onto one surface of an aluminum foil with a thickness of 13 μm, with the areal density of the first positive electrode active material sublayer being 25.5 mg/cm$^2$ and the areal density of the second positive electrode active material sublayer being 0.71 mg/cm$^2$, followed by drying at 120° C. and cold pressing, to obtain a positive electrode plate in which the compaction density of the positive electrode active material layer is 2.4 g/cm$^3$; and then the procedures such as tab forming and slitting are performed to obtain a positive electrode plate with a width of 180 mm.

<Preparation of Negative Electrode Plate>

A negative electrode active material of graphite, a conductive agent of conductive carbon black, a binder of sodium carboxymethylcellulose (CMC), a binder of a butadiene styrene rubber (SBR) and polyaniline are mixed at a mass ratio of 95:1:1:2:1, deionized water is added as a solvent, and the system is stirred under the action of a vacuum mixer until the system is homogeneous, to obtain a negative electrode slurry with a solid content of 54 wt %. The negative electrode slurry is uniformly coated onto one surface of a copper foil with a thickness of 8 μm, with the areal density of the negative electrode active material layer being 12.0 mg/cm$^2$, followed by drying at 110° C. and cold pressing, to obtain a negative electrode plate in which the compaction density of the negative electrode active material layer is 1.65 g/cm$^3$; and then the procedures such as tab forming and slitting are performed to obtain a negative electrode plate with a width of 183 mm.

<Preparation of electrolyte solution>, <Preparation of Separator> and <Preparation of Lithium Ion Battery> are the same as those of example 1.

Example 7

<Preparation of Positive Electrode Plate>

A positive electrode active material of lithium iron phosphate, a conductive agent conductive of carbon black, a binder of polyvinylidene fluoride and benzoquinone are mixed at a mass ratio of 95:1:2:2, then N-methylpyrrolidone (NMP) is added as a solvent, and the system is stirred under the action of a vacuum mixer until the system is homogeneous, to obtain a positive electrode slurry with a solid content of 65 wt %. The positive electrode slurry is uniformly coated onto one surface of an aluminum foil with a thickness of 13 μm, with the areal density of the positive electrode active material layer being 26 mg/cm$^2$, followed by drying at 120° C. and cold pressing, to obtain a positive electrode plate in which the compaction density of the positive electrode active material layer is 2.4 g/cm$^3$; and then the procedures such as tab forming and slitting are performed to obtain a positive electrode plate with a width of 180 mm.

<Preparation of Negative Electrode Plate>

<Preparation of First Negative Electrode Slurry>

A negative electrode active material of first graphite, a conductive agent of conductive carbon black, a binder of sodium carboxymethylcellulose (CMC), a binder of a butadiene styrene rubber (SBR) and polyaniline are mixed at a mass ratio of 94:1:1:2:2, deionized water is added as a solvent, and the system is stirred under the action of a vacuum mixer until the system is homogeneous, to obtain a first negative electrode slurry with a solid content of 54 wt %, wherein the capacity per gram of the first graphite is 348 mAh/g and the specific surface area of the first graphite BET1 is 0.6 m$^2$/g.

<Preparation of Second Negative Electrode Slurry>

A negative electrode active material of second graphite, a conductive agent of conductive carbon black, a binder of sodium carboxymethylcellulose (CMC), a binder of a butadiene styrene rubber (SBR) and polyaniline are mixed at a mass ratio of 94:1:1:2: 2, deionized water is added as a solvent, and the system is stirred under the action of a vacuum mixer until the system is homogeneous, to obtain a second negative electrode slurry with a solid content of 54 wt %, wherein the capacity per gram of the second graphite is 352 mAh/g and the specific surface area of the second graphite BET2 is 1.4 m$^2$/g.

<Preparation of Negative Electrode Plate Containing First Negative Electrode Active Material Sublayer and Second Negative Electrode Active Material Sublayer>

The prepared first negative electrode slurry and second negative electrode slurry are simultaneously coated, using a double layer coating process, onto one surface of a copper foil with a thickness of 8 μm, the first negative electrode active material layer and second negative electrode active material layer both having an areal density of 6.0 mg/cm$^2$, followed by drying at 110° C. and cold pressing, to obtain a negative electrode plate in which the compaction density of the negative electrode active material layer is 1.65 g/cm$^3$; and then the procedures such as tab forming and slitting are performed to obtain a negative electrode plate with a width of 183 mm.

<Preparation of electrolyte solution>, <Preparation of Separator> and <Preparation of Lithium Ion Battery> are the same as those of example 1.

Example 8

<Preparation of Negative Electrode Plate>

<Preparation of First Negative Electrode Slurry>

A negative electrode active of material graphite, a conductive agent of conductive carbon black, a binder of sodium carboxymethylcellulose (CMC), and a binder of a butadiene styrene rubber (SBR) are mixed at a mass ratio of 96:1:1:2, deionized water is added as a solvent, and the system is stirred under the action of a vacuum mixer until the system is homogeneous, to obtain a first negative electrode slurry with a solid content of 54 wt %.

<Preparation of Second Negative Electrode Slurry>

A negative electrode active material of silicon monoxide, a conductive agent of conductive carbon black, a binder of sodium carboxymethylcellulose (CMC), a binder of a butadiene styrene rubber (SBR) and polyaniline are mixed at a mass ratio of 94:1:1:2: 2, deionized water is added as a solvent, and the system is stirred under the action of a vacuum mixer until the system is homogeneous, to obtain a first negative electrode slurry with a solid content of 54 wt %.

<Preparation of Negative Electrode Plate Containing First Negative Electrode Active Material Sublayer and Second Negative Electrode Active Material Sublayer>

The prepared first negative electrode slurry and second negative electrode slurry are simultaneously coated, using a double layer coating process, onto one surface of a copper foil with a thickness of 8 μm, with the areal density of the first negative electrode active material sublayer being 8.1 mg/cm$^2$ and the areal density of the second negative electrode active material sublayer being 0.9 mg/cm$^2$, followed by drying at 110° C. and cold pressing, to obtain a negative electrode plate with a compaction density of 1.68 g/cm$^3$; and then the procedures such as tab forming and slitting are performed to obtain a negative electrode plate with a width of 183 mm.

<Preparation of Positive Electrode Plate>, <Preparation of Electrolyte Solution>, <Preparation of Separator> and <Preparation of Lithium Ion Battery> are the same as those of example 7.

Example 9

<Preparation of Negative Electrode Plate>

A negative electrode of active material graphite, a negative electrode active material of silicon monoxide, a conductive agent of conductive carbon black, a binder of sodium carboxymethylcellulose, a binder of a butadiene styrene rubber and polyaniline are mixed at a mass ratio of 85:9.5:1:1:2:1.5, deionized water is added as a solvent, and the system is stirred under the action of a vacuum mixer until the system is homogeneous, to obtain a negative electrode slurry with a solid content of 54 wt %. The negative electrode slurry is uniformly coated onto one surface of a copper foil with a thickness of 8 μm, with the areal density of the negative electrode active material layer being 9.0 mg/cm², followed by drying at 110° C. and cold pressing, to obtain a negative electrode plate in which the compaction density of the negative electrode active material layer is 1.68 g/cm³; and then the procedures such as tab forming and slitting are performed to obtain a negative electrode plate with a width of 183 mm.

<Preparation of Positive Electrode Plate>, <Preparation of Electrolyte Solution>, <Preparation of Separator> and <Preparation of Lithium Ion Battery> are the same as those of example 7.

Example 10 to Example 13

In the <Preparation of Negative Electrode Plate>, the procedure is the same as that of Example 7, except that the capacities per gram and specific surface areas of the first and second graphite are adjusted as shown in Table 2.

Comparative Example 1

<Preparation of Positive Electrode Plate>

A positive electrode active material of lithium iron phosphate (LiFePO₄), a conductive agent conductive of carbon black, and a binder of polyvinylidene fluoride (PVDF) are mixed at a mass ratio of 97:1:2, then N-methylpyrrolidone (NMP) is added as a solvent, and the system is stirred under the action of a vacuum mixer until the system is homogeneous, to obtain a positive electrode slurry with a solid content of 65 wt %. The positive electrode slurry is uniformly coated onto one surface of an aluminum foil with a thickness of 13 μm, with the areal density of the positive electrode active material layer being 26.0 mg/cm², followed by drying at 120° C. and cold pressing, to obtain a positive electrode plate in which the compaction density of the positive electrode active material layer is 2.4 g/cm³; and then the procedures such as tab forming and slitting are performed to obtain a positive electrode plate with a width of 180 mm.

<Preparation of Negative Electrode Plate>

Graphite, a conductive agent conductive of carbon black, a binder of sodium carboxymethylcellulose (CMC), and a binder of a butadiene styrene rubber (SBR) are mixed at a mass ratio of 96:1:1:2, deionized water is added as a solvent, and the system is stirred under the action of a vacuum mixer until the system is homogeneous, to obtain a negative electrode slurry with a solid content of 54 wt %. The negative electrode slurry is uniformly coated onto one surface of a copper foil with a thickness of 8 μm, with the areal density of the negative electrode active material layer being 12.0 mg/cm², followed by drying at 110° C. and cold pressing, to obtain a negative electrode plate in which the compaction density of the negative electrode active material layer is 1.65 g/cm³; and then the procedures such as tab forming and slitting are performed to obtain a negative electrode plate with a width of 183 mm.

<Preparation of Electrolyte Solution>, <Preparation of Separator> and <Preparation of Lithium Ion Battery> are the same as those of example 1.

Comparative Example 2

<Preparation of Positive Electrode Plate>

A positive electrode active material of $LiNi_{0.5}Co_{0.2}Mn_{0.2}O_2$, a conductive agent conductive of carbon black, and a binder of polyvinylidene fluoride (PVDF) are mixed at a mass ratio of 97:1:2, then N-methylpyrrolidone (NMP) is added as a solvent, and the system is stirred under the action of a vacuum mixer until the system is homogeneous, to obtain a positive electrode slurry with a solid content of 75 wt %. The positive electrode slurry is uniformly coated onto one surface of an aluminum foil with a thickness of 13 μm, with the areal density of the positive electrode active material layer being 21.4 mg/cm², followed by drying at 120° C. and cold pressing, to obtain a positive electrode plate in which the compaction density of the positive electrode active material layer is 3.4 g/cm³; and then the procedures such as tab forming and slitting are performed to obtain a positive electrode plate with a width of 180 mm.

<Preparation of Electrolyte Solution>, <Preparation of Positive Electrode Plate>, <Preparation of Separator> and <Preparation of Lithium Ion Battery> are the same as those of example 1.

The relevant parameters of the positive electrode active material layer and negative electrode active material layer of the above Examples 1 to 13 and Comparative examples 1 to 2 are shown in Table 1 to Table 2 below. Among them, in Examples 1 to 9 and Comparative Examples 1 to 2, the type of the positive electrode active material, the type of the quinone compound, the type of the negative electrode active material and the type of the conductive polymer are as shown in Table 1; and in Examples 10 to 13, the capacity per gram and specific surface area of the first graphite, and the capacity per gram and specific surface area of the second graphite are as shown in Table 2.

TABLE 1

Parameters results of Examples 1 to 9 and Comparative examples 1 to 2

| Name | Positive electrode active material | Quinone compound | Negative electrode active material | Conductive polymer |
|---|---|---|---|---|
| Example 1 | LFP | Anthraquinone | Graphite | Polyaniline |
| Example 2 | NCM523 | Anthraquinone | Graphite | Polythiophene |
| Example 3 | First positive electrode active material sublayer: NCM523 | None | Graphite | Polypyrrole |
|  | Second positive electrode active material sublayer: LFP | Anthraquinone |  |  |
| Example 4 | Frst positive electrode active material sublayer: LFP | Anthraquinone | Graphite | Polyaniline |
|  | Second positive electrode active material sublayer: LFP | None |  |  |
| Example 5 | NCM523 + LFP | Naphthoquinone | Graphite | Polypyrrole |
| Example 6 | First positive electrode active material sublayer: LFP | None | Graphite | Polyaniline |
|  | Second positive electrode active material sublayer: None | Benzoquinone |  |  |
| Example 7 | LFP | Benzoquinone | First negative electrode active material sublayer: | Polyaniline |

TABLE 1-continued

Parameters results of Examples 1 to 9 and Comparative examples 1 to 2

| Name | Positive electrode active material | Quinone compound | Negative electrode active material | Conductive polymer |
|---|---|---|---|---|
| Example 8 | LFP | Benzoquinone | First graphite Second negative electrode active material sublayer: Second graphite | Polyaniline |
| | | | First negative electrode active material sublayer: Graphite | Polyaniline |
| | | | Second negative electrode active material sublayer: SiO | Polyaniline |
| Example 9 | LFP | Benzoquinone | Graphite + SiO | Polyaniline |
| Comparative example 1 | LFP | None | Graphite | None |
| Comparative example 2 | NCM523 | None | Graphite | None |

TABLE 2

Relevant parameters of Examples 10 to 13

| | First graphite | | Second graphite | |
|---|---|---|---|---|
| Name | Gram capacity (mAh/g) | Specific surface area (m²/g) | Gram capacity (mAh/g) | Specific surface area (m²/g) |
| Example 10 | 342 | 0.8 | 351 | 0.7 |
| Example 11 | 345 | 0.2 | 343 | 1 |
| Example 12 | 354 | 0.6 | 351 | 1.5 |
| Example 13 | 353 | 0.8 | 352 | 2 |

In addition, the lithium ion batteries prepared in the above-mentioned Examples 1 to 13 and Comparative Examples 1 to 2 are tested for performance. The test results are shown in Table 3 below.

Test of Energy Density:

A charging and discharging device is used to charge at a 1/3 C current to an end-of-charge voltage (C is the nominal capacity), and charge at the end-voltage constant voltage until the current decreases to 0.05 C, and then discharge to the end-of-discharge voltage with a 1/3 C current, wherein the energy density is calculated according to the following formula using the capacity tested during the discharge: Energy density (Wh/L)=discharge capacity (Ah)×operating voltage (V)/battery volume (L), and lithium ion battery volume (L)=lithium ion battery thickness×lithium ion battery width×lithium ion battery height. Among them, for the lithium ion battery whose positive electrode active material is lithium iron phosphate, the end-of-charge voltage is 3.65 V, the end-of-discharge voltage is 2.5 V, and the working voltage is 3.22 V; for the lithium ion battery whose positive electrode active material is $LiNi_{0.5}Co_{0.2}Mn_{0.3}O_2$, the end-of-charge voltage is 4.3 V, the end-of-discharge voltage is 2.8 V, and the working voltage is 3.68 V; and for the lithium ion battery whose positive electrode active material contains lithium iron phosphate and $LiNi_{0.5}Co_{0.2}Mn_{0.3}O_2$, the end-of-charge voltage is 4.3 V, the end-of-discharge voltage is 2.5 V, and the working voltage is 3.45 V. The thickness of the lithium ion battery is 39 mm, the width of the lithium ion battery is 160 mm, the height of the lithium ion battery is 203 mm, and the volume of the lithium ion battery is 1.27 L.

TABLE 3

Performance test results of Examples 1 to 13 and Comparative examples 1 to 2

| Name | Discharge capacity (Ah) | Energy density (Wh/L) |
|---|---|---|
| Example 1 | 152 | 385 |
| Example 2 | 195 | 564 |
| Example 3 | 174 | 471 |
| Example 4 | 151 | 382 |
| Example 5 | 173 | 467 |
| Example 6 | 154 | 390 |
| Example 7 | 154 | 390 |
| Example 8 | 168 | 425 |
| Example 9 | 169 | 427 |
| Example 10 | 152 | 385 |
| Example 11 | 151 | 383 |
| Example 12 | 154 | 390 |
| Example 13 | 154.5 | 391.4 |
| Comparative example 1 | 150 | 380 |
| Comparative example 2 | 190 | 550 5 |

According to the above results, it can be seen that in example 1 to example 13, the lithium ion battery comprises a positive electrode plate and a negative electrode plate, the positive electrode active material layer of the positive electrode plate comprises a quinone compound, the negative electrode active material layer of the negative electrode plate comprises a conductive polymer material, the addition proportions of the quinone compound and the conductive polymer are within the ranges of the present application, and the lithium ion battery has a better energy density.

From example 3 and example 4, it can be seen that the lithium ion battery in which the second positive electrode active material sublayer includes anthraquinone has a higher energy density compared with the lithium ion battery in which the first positive electrode active material sublayer includes anthraquinone. In other words, the energy density of the lithium ion batteries can be improved when anthraquinone is comprised in the positive electrode active material sublayer in the positive electrode active material layer, which is away from the positive electrode current collector.

In contrast, the positive electrode active material layer of the positive electrode plate of Comparative Example 1 does not include a quinone compound, and the negative electrode active material layer of the negative electrode plate does not include a conductive polymer material, resulting in the volume energy density of Comparative Example 1 being only 380 Wh/L.

The positive electrode active material layer of the positive electrode plate of Comparative Example 2 does not include a quinone compound, and the negative electrode active material layer of the negative electrode plate does not include a conductive polymer material, resulting in the volume energy density of Comparative Example 2 being only 550 Wh/L.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The foregoing descriptions are merely preferred embodiments of the present disclosure and are not intended to limit the present disclosure. Any modifications, equivalent substitutions, improvements, etc., made within the spirit and principle of the present disclosure should be included within the protection scope of the present disclosure.

The invention claimed is:

1. An electrode assembly, comprising a positive electrode plate and a negative electrode plate,
   wherein the positive electrode plate comprises a positive electrode current collector and a positive electrode active material layer provided on at least one surface of the positive electrode current collector, the positive electrode active material layer comprising a positive electrode active material and a quinone compound;
   the negative electrode plate comprises a negative electrode current collector and a negative electrode active material layer provided on at least one surface of the negative electrode current collector, the negative electrode active material layer comprising a negative electrode active material and a conductive polymer material;
   wherein based on the mass of the positive electrode active material layer, the mass content of the quinone compound $m_c$ % is 0.5% to 3%; the capacity per gram of the quinone compound is $Cap_c$; the capacity per gram of the positive electrode active material is $Cap$;
   and based on the mass of the negative electrode active material layer, the mass content of the conductive polymer material is $m_A$ %, satisfying the relationship of:

$$0.2 \leq \frac{Cap_C - Cap}{Cap} \times m_C/m_A \leq 5.$$

2. The electrode assembly according to claim 1, wherein the quinone compound includes at least one of benzoquinone and derivatives thereof, naphthoquinone and derivatives thereof, and anthraquinone and derivatives thereof.

3. The electrode assembly according to claim 1, wherein the conductive polymer material includes at least one of polyaniline, polypyrrole, polythiophene, polyoxyethylene, polyacrylonitrile, polyphenylene and polyacetylene.

4. The electrode assembly according to claim 1, wherein
   the positive electrode active material layer has an areal density of 16.2 mg/cm² to 40.0 mg/cm²; and
   the negative electrode active material layer has an areal density of 5.8 mg/cm² to 18.0 mg/cm².

5. The electrode assembly according to claim 1, wherein the positive electrode active material layer comprises multiple positive electrode active material sublayers successively stacked along the direction away from the positive electrode current collector, wherein at least one of the multiple positive electrode active material sublayers includes the quinone compound.

6. The electrode assembly according to claim 5, wherein the outermost positive electrode active material sublayer of the multiple positive electrode active material sublayers away from the positive electrode current collector includes the quinone compound, and the remaining positive electrode active material sublayers may or may not include the quinone compound.

7. The electrode assembly according to claim 1, wherein the negative electrode active material layer comprises m negative electrode active material sublayers successively stacked along the direction away from the negative electrode current collector, wherein n negative electrode active material sublayers close to the negative electrode current collector include the conductive polymer material, wherein m/3<n<m, the m is a positive integer greater than or equal to 2, and n is a positive integer greater than or equal to 1.

8. The electrode assembly according to claim 1, wherein the negative electrode active material layer comprises two negative electrode active material sublayers, wherein a first negative electrode active material sublayer close to the negative electrode current collector includes first graphite, and a second negative electrode active material sublayer away from the negative electrode current collector includes second graphite, with the difference between the capacity per gram of the second graphite and the capacity per gram of the first graphite being greater than or equal to 8 mAh/g.

9. The electrode assembly according to claim 1, wherein the negative electrode active material layer comprises two negative electrode active material sublayers, wherein a first negative electrode active material sublayer close to the negative electrode current collector includes first graphite, a second negative electrode active material sublayer away from the negative electrode current collector includes second graphite, the difference between the capacity per gram of the second graphite and the capacity per gram of the first graphite is less than 8 mAh/g, the specific surface area of the second graphite BET2 is greater than the specific surface area of the first graphite BET1.

10. The electrode assembly according to claim 1, wherein the negative electrode active material layer comprises two negative electrode active material sublayers, wherein the first negative electrode active material sublayer close to the negative electrode current collector includes graphite, and the second negative electrode active material sublayer away from the negative electrode current collector includes SiO.

11. The electrode assembly according to claim 1, wherein the positive electrode active material comprises at least one of lithium iron phosphate, lithium manganate, lithium nickel cobalt manganese oxide, lithium cobaltate and nickel-manganese spinel;
   and the negative electrode active material includes at least one of graphite, hard carbon, molybdenum disulfide, silicon, silicon monoxide, ferroferric oxide, tin oxide and titanium dioxide.

12. A secondary battery, comprising the electrode assembly of claim 1.

13. A battery module, comprising the secondary battery of claim 12.

14. A battery pack, comprising the battery module of claim 13.

15. A power consuming device, comprising the battery pack of claim 14.

* * * * *